United States Patent [19]

Takaishi et al.

[11] 3,894,100

[45] July 8, 1975

[54] PROCESS FOR THE PREPARATION OF TRICYCLO (5.3.1.0.$^{3,8}$) UNDECANE

[75] Inventors: Naotake Takaishi; Yoshiaki Inamoto, both of Wakayama; Kiyoshi Tsuchihashi, Kainan, all of Japan

[73] Assignee: Kao Soap Co., Ltd., Tokyo, Japan

[22] Filed: July 2, 1974

[21] Appl. No.: 485,068

[30] Foreign Application Priority Data
July 10, 1973  Japan.............................. 48-77621

[52] U.S. Cl. .............................................. 260/666
[51] Int. Cl............................................ C07c 13/54
[58] Field of Search.................. 260/666 LY, 666 M

[56] References Cited
UNITED STATES PATENTS
3,356,751  12/1967  Schneider...................... 260/666 M OTHER PUBLICATIONS
Derek J. Cash et al., Tetrahedron Letters, No. 52, pp. 6445–6451, 1966.

*Primary Examiner*—Veronica O'Keefe
*Attorney, Agent, or Firm*—Woodhams, Blanchard and Flynn

[57] ABSTRACT

A process for the preparation of tricyclo[5.3.1.0$^{3,8}$]-undecane in which tetramethylenenorbornane is isomerized in the presence of an acid catalyst.

4 Claims, No Drawings

PROCESS FOR THE PREPARATION OF TRICYCLO (5.3.1.0³,⁸) UNDECANE

BACKGROUND OF THE INVENTION

1. Field of the Invention

This invention relates to a process for the preparation of tricyclo[5.3.1.0³,⁸]undecane (II) by the acid catalyzed isomerization of tetramethyleneorbornane (I) according to the following reaction scheme (I):

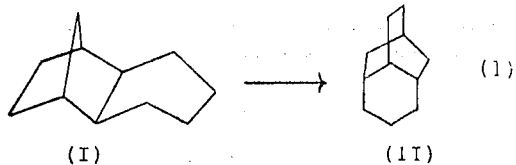

2. Description of the Prior Art

So far as we are aware, there are known the three following tricycloundecane compounds: tetramethylenenorbornane (I) [Alder, et al., Ann., 627, 47 (1959)], homoadamantane (III) [Stetter, et al., Ber., 96, 550 (1963)] and tricyclo [5.3.1.0²,⁶]undecane (IV) [Petrov, et al., Neftekhimiya, 11, 163 (1971)].

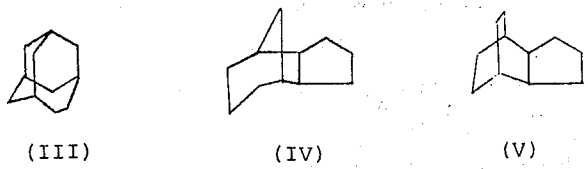

In addition to these, we have recently proposed a synthetic procedure for the preparation of tricyclo[5.2.2.0²,⁶]undecane (V) by hydrogenating tricyclo-[5.2.2.0²,⁶]undecan-3,8-diene obtained by the Diels-Alder reaction between 1,3-cyclohexadiene and dicyclopentadiene (Japanese Application No. 106,514/72, corresponding to U.S. patent application Ser. No. 404 195, filed Oct. 9, 1973).

It has now been found that [5.3.1.0³,⁸]undecane (II), which is a novel tricycloundecane compound, can be synthesized according to the process of this invention.

We have discovered that under specific reaction conditions, isomerization of tetramethylenenorbornane (I), can be interrupted at a stage short of the final formation of 1- and 2-methyladamantanes, at which stage the novel compound, tricyclo[5.3.1.0³,⁸]undecane (II), is the main constituent of the reaction mixture.

More specifically, in accordance with this invention, there is provided a process in which tricyclo[5.3.1.0³,⁸]undecane (II) can be synthesized simply by isomerizing tetramethylenenorbornane (I) in the presence of an acid catalyst under controlled reaction conditions.

Various research investigations have heretofore been made on the isomerization of tricycloundecanes to produce 1-methyladamantane, Schleyer, et al., *Tetrahedron Letters*, 305 (1961); Schneider, et al., U.S. Pat. No. 3 356 751; McKervey, et al., *Tetrahedron Letters*, 27, 4317 (1971); Petrov, et al., Neftekhimiya, 11, 163 (1971). However, there is known no instance in which any reaction intermediates are isolated. As a result of our investigations on the mechanism of the acid-catalyzed isomerization of tetramethylenenorbornane (I), we have found that the isomerization reaction is a series of consecutive reactions in which tetramethylenenorbornane (I) has substantially disappeared in the course of the reaction and that a mixture of several reaction intermediates, including tricyclo[5.3.1.0³,⁸]undecane (II) are formed. These intermediates are then converted during the further course of the reaction to 1- and 2-methyladamantanes. More specifically, it has been found that when the acid-catalyzed isomerization reaction of tetramethylenenorbornane (I) is interrupted at an appropriate stage or when the above isomerization reaction is conducted under milder conditions than those adopted for complete isomerization to form 1-methyladamantane, a reaction intermediate mixture consisting substantially of tricyclo[5.3.1.0³,⁸]undecane (II) can be obtained, and that the separation of the mixture by appropriate means such as distillation or chromatography, gives tricyclo[5.3.1.0³,⁸]undecane (II) in a yield of 40 to 50 wt.%.

Thus, the process of this invention is characterized by the features that the starting tetramethylenenorbornane (I) is isomerized under controlled mild reaction conditions. In contrast, if tetramethylenenorbornane is isomerized under drastic conditions, the final product, 1-methyladamantane, is directly formed in a short reaction period and is present in a mixture of tricyclic undecanes containing the intermediate (II) that are difficult to isolate. The term "drastic reaction conditions" in this specification means such conditions in which the reaction is carried out in the absence of a solvent at a temperature higher than 50°C by employing as a catalyst a strong Lewis acid such as aluminum halides and antimony pentahalides in an amount of greater than 50 mole percent based on the starting substance (I). In contrast, the term "controlled mild conditions" to give intermediate products containing in a large amount the desired product (II) of this invention refers to carrying out the reaction in the presence of a solvent, at a temperature preferably below 60°C., and by employing as a catalyst a Bronsted acid or a Lewis acid in an amount less than 20 mol percent, based on the starting substance (I), and that the reaction is conducted while following the reactions by examining the amount formed of the product (II) by, for example, gas chromatography, the reaction being stopped at the point when the concentration of the desired product (II) reaches the highest level.

As the catalyst suitable for attaining such mild reaction conditions, various acid catalysts are effectively employed. Examples of these acid catalysts are: Bronsted acids such as sulfuric acid, fluorosulfonic acid, chlorosulfonic acid, methanesulfonic acid, ethanesulfonic acid, trifluoromethanesulfonic acid, benzenesulfonic acid, and p-toluenesulfonic acid, and Lewis acids such as aluminum halides, preferably aluminum chloride and aluminum bromide, zinc halides, preferably zinc chloride and zinc bromide, boron halides, preferably boron trifluoride, and antimony halides, preferably antimony pentafluoride.

In the case of a Bronsted acid, the amount of the acid catalyst used is not particularly critical, and in order to complete the reaction in a short period of time it is permissible to use the catalyst in an equimolar amount or in excess, based on starting substance I, i.e. from 0.1 to about 50 moles of Bronsted acid, per mole of (I). In contrast, in the case of Lewis acids such as aluminum halides, the object of the invention can be sufficiently attained when the catalyst is used in an amount of 0.01 to 0.2 mole, preferably 0.03 to 0.1 mole, per mole of the starting tetramethylenenorbornane (I). If the catalyst is used in an amount exceeding the above range, the object of this invention cannot be attained because the isomerization of the desired product (II) to 1-methyladamantane is also caused to proceed and the reaction product is difficult to separate.

The solvent used is not particularly critical to the reaction, and any of solvents unreactive towards the catalyst, such as armoatic hydrocarbons, aliphatic hydrocarbons, halogenated hydrocarbons and ethers can be used. We can thus use any solvent inert to the reaction.

As the solvent, it is preferred to use halogenated lower hydrocarbons, preferably chlorinated or brominated hydrocarbons containing 1 to 6 carbon atoms such as methylene chloride, methylene bromide, chloroform, 1,2-dichloroethane, 1,2-dibromoethane, 1,2-dichloropropane, 1,3-dichloropropane, 1,3-dichlorobutane, 2-methyl-1,4-dichlorobutane, chlorocyclohexane and the like. The amount of solvent employed is from 0.1 to 500 times the weight of the starting material I.

The reaction proceeds at a temperature ranging from −30° to +100°C., but it is preferred that the reaction is carried out at a temperature below 60°C, for example in the range of −10° to 50°C.

This invention will now be further described by reference to the following illustrative Examples. Because the product of this invention, tricyclo[5.3.1.0$^{3,8}$]undecane (II), is a novel compound, its structure determination is also shown in Examples.

EXAMPLE 1

A solution of 15 g (0.1 mole) of tetramethylenenorbornane (I) in 100 ml of methylene chloride was agitated at 0°C. Then, 1.3 g (0.01 mole) of anhydrous aluminum chloride was added to the solution, and the mixture was heated and refluxed under agitation for 1 hour. The reaction mixture was allowed to cool and then poured over 100 ml of ice water. The organic layer was separated and the aqueous layer was extracted with methylene chloride. The methylene chloride extract was combined with the organic layer, and the mixture was washed with a saturated aqueous solution of sodium hydrogencarbonate and then with water, and then dried over anhydrous sodium sulfate. Methylene chloride was distilled off, and the residue was subjected to fractionation. The highest boiling point fraction (boiling at 111° to 112°C. under 36 mmHg) was separated, whereby 6.3 g (yield: 42 wt.%) of tricyclo[5.3.1.0$^{3,8}$]undecane was obtained.

Melting Point:
62°–63°C (sealed tube)

Elemental Analysis:
Found: C, 87.8; H, 12.2%,
Calculated for $C_{11}H_{18}$: C, 87.92: H, 12.08%

IR Spectrum (cm$^{-1}$):
2925, 2890, 2870, 2850, 1480, 1465, 1450, 1340, 975, 895, 845

Mass Spectrum (m/e) (Relative Intensity):
150 (M$^+$, 100), 122 (39), 121 (39), 109 (12), 108 (16), 107 (19), 93 (27), 81 (27), 80 (46), 79 (40), 67 (35), 55 (18), 41 (40)

$^1$H NMR Spectrum (CDCl$_3$ solvent): δ1.0 – 2.0 ppm, complex multiplet $^{13}$C NMR Spectrum (CDCl$_3$ solvent, 15.1 MHz, TMS at 0 ppm) (ppm):
15.2, 24.8, 26.3, 27.1, 30.9, 31.9, 32.3, 33.1

In view of the fact that the melting point is relatively high (62°–63°C) though the product is a saturated hydrocarbon having 11 carbon atoms and both IR and $^1$H NMR spectra are simple, it is considered from the data that the product has a highly symmetric structure. Further, the fact that in the mass spectrum the parent peak is the base peak is evidence that the product is a cage molecule. Eight kinds of carbon atoms are observed in the $^{13}$C NMR spectrum, and therefore, the product can be considered to be tricyclo[5.3.1.0$^{3,8}$]undecane (II) or tricyclo[4.4.1.0$^{2,8}$]undecane of the following formula (VI):

(VI)

However, the compound (VI) includes a 7-membered ring and has a great distortion. Therefore, it cannot be considered to be an intermediate that can be isolated in a stable condition.

In view of the foregoing, it is concluded that the isolated product is tricyclo[5.3.1.0$^{3,8}$]undecane (II).

EXAMPLE 2

A solution of 7.5 g (0.05 mole) of tetramethylenenorbornane (I) in 100 ml of methylene chloride was agitated at 0°C, and 7.5 g (0.05 mole) of trifluoromethanesulfonic acid was added to the solution. Then, the mixture was heated and refluxed for 6 hours under agitation. The reaction mixture was allowed to cool and poured over 100 ml of ice water. The organic layer was separated and the aqueous layer was extracted with methylene chloride. The methylene chloride extract was combined with the organic layer, and the mixture was washed with a saturated aqueous solution of sodium hydrogencarbonate and with water, and then dried over anhydrous sodium sulfate. Methylene chloride was distilled off, and the residue was subjected to fractionation and a fraction boiling at 110° – 115°C. under 36 mmHg was collected, whereby 3.38 g (yield: 45 wt.%) of tricyclo[5.3.1.0$^{3,8}$]undecane (II) was obtained. All of the IR, NMR and MS spectra of the thus obtained compound were in agreement with those of the product (II) obtained in Example 1.

Tricyclo[5.3.1.0$^{3,8}$]undecane can be isomerized to form 1-methyladamantane, a known useful compound, by the process described in Japanese Patent Application No. 77623/73, filed July 10, 1973, and the corresponding U.S. patent application Ser. No. 485,069, filed July 2, 1974, being filed concurrently herewith (Attorneys Reference Furuya Case 359), the entire contents of which are incorporated herein by reference. The following examples describe the preparation of 1-methyladamantane from tricyclo[5.3.1.0$^{3,8}$]undecane.

EXAMPLE 3

A solution of 15 g (0.1 mole) of tricyclo[5.3.1.0$^{3,8}$]undecane (II) in 100 ml of methylene chloride was agitated at 0°C, and 2.0 g (0.015 mole) of anhydrous aluminum chloride was added to the solution. The mixture was heated and refluxed under agitation for 6 hours, and the resulting reaction mixture was allowed to cool and then poured over 100 ml of ice water. The organic layer was separated, and the water layer was extracted with methylene chloride. The methylene chloride extract was combined with the organic layer, and the mixture was washed with a saturated aqueous solution of sodium hydrogencarbonate and then with water, and then dried over anhydrous sodium sulfate. Methylene chloride was distilled off and the residue was sublimed to obtain 13.7 g (yield: 91 wt.%) of 1-methyladamantane. All of the IR, NMR and MS spectra were in agreement with those of the authentic sample synthesized from tetramethylenenorbornane according to the method of Schleyer, et al. [Tetrahedron Letters, 305 (1961)].

EXAMPLE 4

A mixture of 7.5 g (0.05 mole) of tricyclo[5.3.1.0$^{3,8}$]-undecane (II) and 76 g (0.5 mole) of trifluoromethane-sulfonic acid was heated at 80°C for 30 hours under agitation. The reaction mixture was allowed to cool and then poured over 200 ml of ice water. The organic layer was separated and the water layer was extracted with methylene chloride. The methylene chloride extract was combined with the organic layer, and the mixture was washed with a saturated aqueous solution of sodium hydrogencarbonate and then with water, and dried over anhydrous sodium sulfate. Methylene chloride was distilled off and the residue was sublimed to obtain 6.8 g (yield: 90 wt.%) of 1-methyladamantane. All of the IR, NMR and MS spectra of the product were in agreement with those of the authentic sample.

The embodiments of this invention in which an exclusive property or privilege is claimed are defined as follows:

1. A process for preparing tricyclo[5.3.1.0$^{3,8}$]undecane which comprises isomerizing tetramethylenenorborane (I) in an inert solvent, at a temperature in the range of −30°C to 100°C, in the presence of an acid catalyst selected from the group consisting of (1) a Bronsted acid and (2) a Lewis acid in an amount of 0.01 to 0.2 mole per mole of I, terminating the isomerization reaction when the content of tricyclo[5.3.1.0$^{3,8}$]undecane in the reaction mixture is in the range of at least about 40 wt.%, excluding the solvent and the acid catalyst, and recovering tricyclo[5.3.1.0$^{3,8}$]undecane from the reaction mixture.

2. The process according to claim 1, wherein the temperature of the isomerization reaction is in the range of −10°C to 50°C.

3. The process according to claim 2, wherein the acid catalyst is a member of the group consisting of sulfuric acid, fluorosulfonic acid, chlorosulfonic acid, methanesulfonic acid, ethanesulfonic acid, trifluoromethanesulfonic acid, benzenesulfonic acid, and p-toluenesulfonic acid.

4. The method according to claim 2, wherein the acid catalyst is 0.03 to 0.1 mole of an aluminum halide or antimony pentahalide per mole of I.

* * * * *